United States Patent
Castello et al.

(10) Patent No.: US 11,909,707 B2
(45) Date of Patent: Feb. 20, 2024

(54) MESSAGE SCHEMA MIGRATION IN MESSAGING SYSTEMS

(71) Applicant: Red Hat, Inc., Raleigh, NC (US)

(72) Inventors: Carles Arnal Castello, Valencia (ES); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 46 days.

(21) Appl. No.: 17/721,568

(22) Filed: Apr. 15, 2022

(65) Prior Publication Data
US 2023/0336520 A1 Oct. 19, 2023

(51) Int. Cl.
*H04L 51/56* (2022.01)
*H04L 51/066* (2022.01)

(52) U.S. Cl.
CPC ............ *H04L 51/56* (2022.05); *H04L 51/066* (2013.01)

(58) Field of Classification Search
None
See application file for complete search history.

(56) References Cited

U.S. PATENT DOCUMENTS

| | | | | |
|---|---|---|---|---|
| 7,194,462 B2* | 3/2007 | Riccardi | ............ | G06F 16/8358 |
| | | | | 707/763 |
| 7,249,345 B2* | 7/2007 | Zorc | ............ | G06F 8/30 |
| | | | | 717/114 |
| 7,970,779 B2* | 6/2011 | Smirnov | ............ | G06F 9/541 |
| | | | | 707/756 |
| 8,032,828 B2* | 10/2011 | Su | ............ | G06F 16/88 |
| | | | | 715/236 |
| 8,150,923 B2* | 4/2012 | Vaschillo | ............ | H04N 1/32379 |
| | | | | 709/206 |
| 8,375,094 B2* | 2/2013 | Hawkins | ............ | G06F 15/16 |
| | | | | 709/201 |
| 8,464,211 B2* | 6/2013 | Neagu | ............ | G06F 9/451 |
| | | | | 717/174 |
| 9,349,026 B2* | 5/2016 | Gianniotis | ............ | H04L 63/0407 |
| 9,386,119 B2* | 7/2016 | Chetlur | ............ | H04W 4/18 |
| 9,514,205 B1* | 12/2016 | Yazicioglu | ............ | G06F 16/235 |
| 10,084,657 B2* | 9/2018 | Shevenell | ............ | H04L 41/12 |
| 10,382,908 B2* | 8/2019 | Lee | ............ | H04L 69/08 |
| 10,579,373 B2* | 3/2020 | Tong | ............ | G06F 8/76 |
| 10,606,891 B2* | 3/2020 | Kamiya | ............ | G06F 16/84 |
| 10,904,200 B2* | 1/2021 | Galbraith | ............ | G06F 9/547 |
| 10,911,379 B1* | 2/2021 | Bray | ............ | H04L 51/18 |

(Continued)

OTHER PUBLICATIONS

Dhia, "Kafka the Afterthoughts: Message Encoding and Schema Management", Jan. 24, 2020, 12 pages https://medium.com/race-conditions/kafka-the-afterthoughts-the-schema-management-7ea30e9518e4.

(Continued)

*Primary Examiner* — Backhean Tiv
(74) *Attorney, Agent, or Firm* — Lowenstein Sandler LLP (57) ABSTRACT

Systems and methods for providing message schema migration in messaging systems. In one implementation, a definition of a messaging schema is received. One or more transformation files associated with the messaging schema is received, wherein the one or more transformation files define a plurality of transformations to be applied to incoming messages. An order of applying the plurality of transformations is determined. The plurality of transformations is applied to a message of the incoming messages according to the determined order. The message is forwarded to a messaging system.

20 Claims, 6 Drawing Sheets

(56) References Cited

U.S. PATENT DOCUMENTS

| | | | |
|---|---|---|---|
| 11,061,929 B2* | 7/2021 | Xu | H04L 63/0876 |
| 11,201,954 B2* | 12/2021 | Nalliannan | H04L 69/08 |
| 11,442,758 B2* | 9/2022 | Mp | G06F 16/25 |
| 11,474,796 B1* | 10/2022 | Mather | G06F 8/77 |
| 2003/0069975 A1* | 4/2003 | Abjanic | H04L 63/0428 709/227 |
| 2003/0167444 A1* | 9/2003 | Zorc | G06F 8/30 715/234 |
| 2004/0003389 A1* | 1/2004 | Reynar | G06F 8/65 717/178 |
| 2006/0294039 A1* | 12/2006 | Mekenkamp | G06F 16/14 |
| 2007/0150806 A1* | 6/2007 | Hartmann | G06F 40/226 717/143 |
| 2007/0174852 A1* | 7/2007 | Smirnov | G06F 9/541 719/328 |
| 2010/0115041 A1* | 5/2010 | Hawkins | G06Q 10/107 709/206 |
| 2012/0159306 A1* | 6/2012 | Sharma | G06F 9/4493 715/234 |
| 2013/0173672 A1* | 7/2013 | Manis | G06F 16/211 707/803 |
| 2014/0280460 A1* | 9/2014 | Nemer | G06F 16/24578 709/219 |
| 2014/0297692 A1* | 10/2014 | Doi | G06F 16/88 707/803 |
| 2016/0315900 A1* | 10/2016 | Rowny | H04L 45/24 |
| 2017/0132194 A1* | 5/2017 | Lee | G06F 40/18 |
| 2018/0075049 A1* | 3/2018 | Capillo Carril | G06F 16/88 |
| 2018/0246984 A1* | 8/2018 | Kamiya | G06F 16/84 |
| 2019/0311050 A1* | 10/2019 | Capillo Carril | G06F 16/25 |
| 2020/0233904 A1* | 7/2020 | Capillo Carril | G06F 16/211 |
| 2021/0191909 A1* | 6/2021 | Esman | G06F 3/0482 |
| 2021/0294848 A1* | 9/2021 | Keagy | E21B 47/00 |

OTHER PUBLICATIONS

Sending and Receiving MessageQ Messages, accessed Dec. 14, 2021, 20 pages https://docs.oracle.com/cd/E13203_01/tuxedo/msgq/msgq40a/prog/html/ch1.htm.

"Defining Messages and Transformations", 5 pages https://documentation.nexj.com/crmdev99/defining-messages-and-transformations-39458950.html.

Curry et al., "Extending Message-Oriented Middleware using Interception", Department of Information Technology, National University of Ireland, Galway, Ireland, Jul. 2008, 7 pages https://www.researchgate.net/publication/220035287.

Seroter, "Schema-On-Write And Schema-On-Read Doesn't Just Apply to Databases. it Applies to Message Queues, Too", Director of Outbound Product Management at Google Cloud, Jul. 7, 2021, 17 pages https://seroter.com/2021/07/07/schema-on-write-and-schema-on-read-doesnt-just-apply-to-databases-it-applies-to-message-queues-too/.

* cited by examiner

MESSAGE SCHEMA MIGRATION IN MESSAGING SYSTEMS

TECHNICAL FIELD

The present disclosure is generally related to middleware, and more particularly, to message schema migration in messaging systems.

BACKGROUND

Middleware (also known as a middleware layer) is traditionally a class of computer software that provides services to software applications beyond those services available from an operating system. Commonly, a middleware layer enables communication and management of data in distributed applications. One type of middleware is referred to as message-oriented middleware, which is used to route messages between software applications. A message as used herein broadly refers to communication between applications. Message-oriented middleware may include software and/or hardware components facilitating sending and receiving messages between computer systems and/or software applications.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Implementations of the disclosure are directed to providing message schema migration in messaging systems.

A messaging system (also referred to as "message-oriented middleware") is a system that is used to route messages between software applications over a communication channel accessible via an application programming interface (API). Messaging systems allow for decoupling of software applications communicating to each other, i.e., the sender and the receiver application are not expected to be aware of each other's identity, structure, functions, etc. A software application "A" can send a message to the messaging system (e.g., via an API call), and a software application "B" can receive the message from the message-oriented middleware system (e.g., via another API call) without directly interacting with the software application "A."

Messaging systems typically utilize APIs, which can be exposed to the software applications and can include a set of API calls referencing various functions, which the applications can invoke. An API call can identify the function to be invoked and can optionally specify one or more input or output parameters of the function, as well as the return value of the function. An API function can be a sequence of program instructions that perform a particular operation. An API parameter can be a value of the API function.

In order to route messages, messaging systems can use one or more communication channels. A communication channel carries self-contained units of information, e.g., in the form of a rich text format (RTF) document or an object in a serialized form (e.g., an object that has been converted into a series of bytes). Routing messages as a series of bytes enables messaging systems to exhibit high performance (i.e., allows for messaging systems to be scaled horizontally easily and allows for large amounts of data to be transferred from a sender to a receiver). However, routing messages as a series of bytes also includes the data being treated as opaque (i.e., the messaging systems is not aware of the content being transferred when routing each message).

In some systems, it can be helpful to know the content of the data being transferred. For example, a messaging system may need to change the structure of the message from one structure to another for a particular reason (e.g., to satisfy a customer's business needs and/or to make a business decision based on the content of the message and/or to meet a particular software application and/or computer system's specifications). In such situations, a messaging system may not be able to change the structure of the message from one structure to another without being aware of the content of the message, since the content of the message can be important to take into consideration when changing the structure of the message.

Messaging systems may attempt to mitigate the opaque data issue through the use of schemas. Schemas are documents that describe the structure of a message so that the receiving software application can use the information described in the schema to deserialize the message (e.g., a process that reverses the serialization process by converting a series of bytes into an object) and process the information delivered. In particular, schemas define how data is organized by specifying fields, data types, and relationships between these entities. Some common schema types are Avro, JavaScript Object Notation (JSON) Schema, and Protocol Buffers (Protobuf). For example, an Avro schema defining user information can be the following:

```
{"namespace": "example.avro",
"type": "record",
"name": "user",
"fields": [
    {"name": "name", "type": "string"},
    {"name": "country", "type": "string"}
]
}
```

This example schema describes a record containing four fields, namespace, type, name, and fields. The "type" field identifies the type of schema document. In Avro schemas, the "type" is typically "record," which indicates that multiple fields will be defined in the schema. The "namespace" field identifies the namespace in which the object resides. The "name" field is the name of the schema, which, when used with the "namespace" field, is a unique identifier of the schema. The "fields" field defines each field contained in a record's value and the data type of each field. In this example, the "fields" field defines the name of each field, "name" and "country." The "fields" field also defines that each field, "name" and "country," has a string data type.

In an example, a software application can send a message to a messaging system. Another software application can receive the message from the messaging system and deserialize the message using the above-described schema. For example, a message that is compliant to the above-described example schema can be deserialized as the following:

```
{"name": "John",
"country": "Spain"
}
```

Thus, even though the messaging system is not aware of the content of the message, a receiving software application can deserialize/process the message received using the above-described example schema.

However, in some examples, the original schema can be altered in order to, for example, add an additional field. For example, the above-described schema can be altered as follows:

```
{"namespace": "example.avro",
"type": "record",
"name": "user",
"fields": [
    {"name": "name", "type": "string"},
    {"name": "country", "type": "string"}
    {"name": "city", "type": "string}
]
}
```

As described above, a new "city" field that was not present in the original schema has now been added. In an example, a software application can send a message to a messaging system, where the message belongs (i.e., is compliant to) to the altered schema. Another software application can receive the message from the messaging system and deserialize the message using the above-described altered schema. For example, the message can be deserialized as the following:

```
{"name": "John",
"county": "Spain"
"city": "Vigo"
}
```

However, in some examples, a software application can send a message to a messaging system, where the message belongs to a particular schema (e.g., the original schema described above), while another software application can receive the message from the messaging system and attempt to deserialize the message using a different schema or a different version of the schema that was used by the sender software application (e.g., the above-described altered schema). In the absence of metadata identifying the schema, the receiving application would not be able to identify whether a message belongs to a particular schema. As such, when attempting to deserialize the message using the above-described altered schema, the receiving software application might receive an error and/or cause other unexpected behavior instead of performing a successful deserialization of the message.

In other examples, a software application can send a message to a messaging system, where the software application supports a particular schema type and/or format. The receiving software application, however, can support another schema type and/or format. In order for the receiving software application to successfully process the message, the message would need to be translated (i.e., the message would need to be migrated from the schema supported by the sending software application to the schema supported by the receiving software application). Therefore, a strategy to migrate messages and manage the structure of the message by a messaging system can be desired that addresses the migration of message structures and the deserialization of messages on the receiving side.

Aspects of the present disclosure address the above noted and other deficiencies by providing message schema migration in messaging systems. In some embodiments, migration of messages from one schema to another can be performed by the messaging system which would perform a sequence of transformations on an incoming message. Each transformation can be specified by a transformation schema specifying one or more operations, such as adding a new field, modifying an existing field, and/or removing an existing field. Each a transformation schema can be stored in a corresponding file in a human-readable format, such as JSON or YAML. The order of applying the transformations can thus be specified by a sequence of identifiers of the transformation files, which can, in turn, be stored in a file.

Before applying (e.g., performing) each specified transformation, the messaging system can check whether any of the transformations has already been applied to a message. In some embodiments, if any of the transformations has already been applied, the processing device can flag that the transformation has already been applied. For example, the processing device can forward another message specifying the transformation that has already been applied to a channel of the messaging system. In another example, the processing device can store an identifier of the transformation that has already been applied in a data structure stored on the messaging system and/or the sending or receiving software applications. Prior to applying the specified transformations to the message, the processing device can perform one or more validations to the message (e.g., syntax validity or compatibility checks). Responsive to performing the one or more validations to the message, the processing device can apply the specified transformations according to the order specified in the file. Responsive to applying the one or more transformations, the processing device can forward the message to the messaging system.

Aspects of the present disclosure provide message schema migration in messaging systems that enables messages to be migrated from one schema to another without incurring additional cost in terms of resources, performance, and/or time to a sending and receiving software application and/or computer system. A message-oriented middleware system can receive information regarding the set of transformations to be applied from a sender separately from the message itself, thus allowing messages to be migrated from one schema to another without any effect on the message itself or on the cost to the sender or receiver. Thus, message schemas can be migrated using a message-oriented middleware system in an efficient and cost-friendly method.

Figure 1:
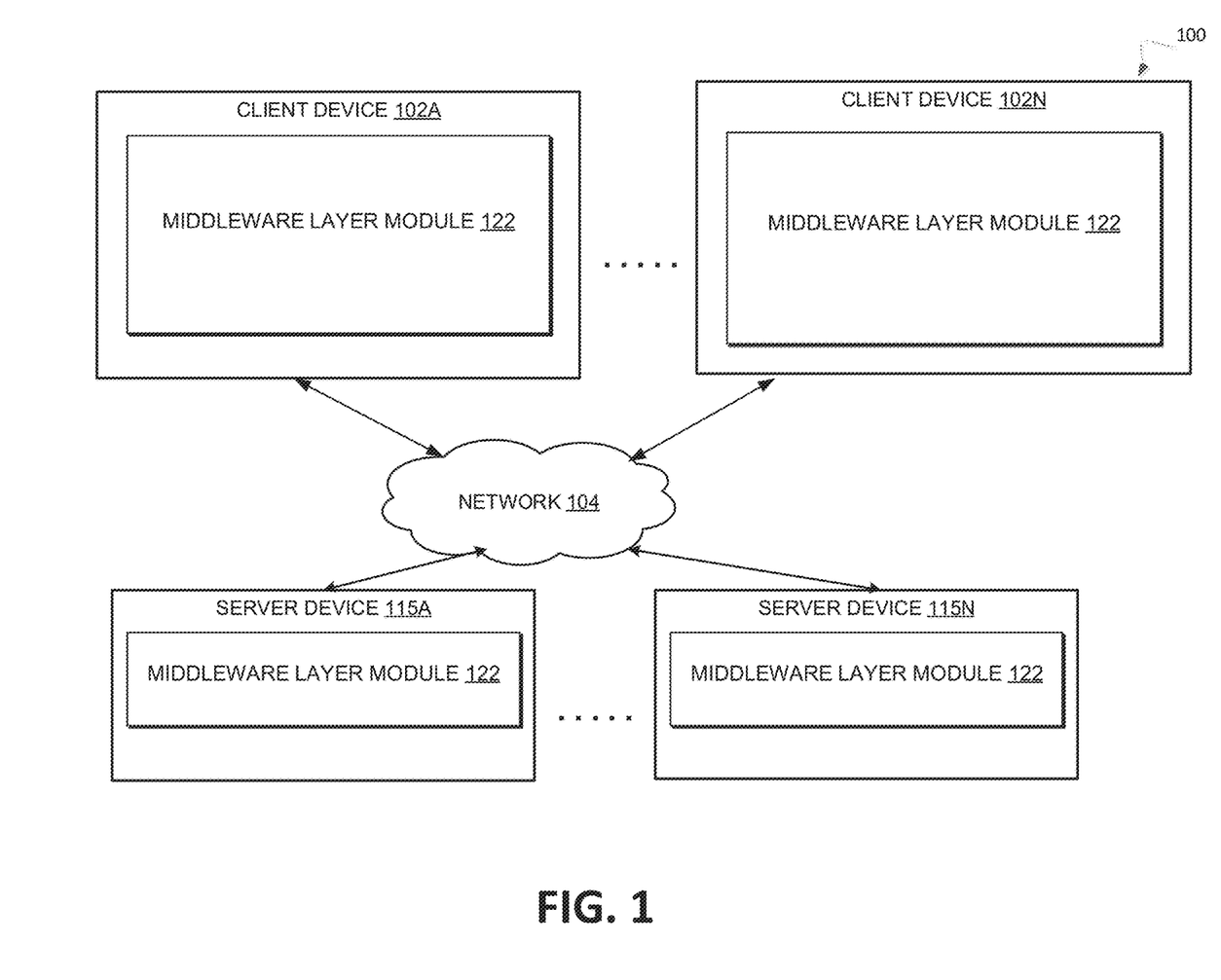
FIG. 1 depicts a block diagram of an example system architecture operating in accordance with one or more aspects of the present disclosure.

FIG. 1 is a diagram of one embodiment of a system architecture for providing message schema migration in messaging systems, in accordance with one or more aspects of the present disclosure. The distributed computer system 100 can include client device 102A, client device 102N, server device 115A, and server device 115N, communicably connected over a network 104. There may be any number of client devices 102A, 102N and any number of server devices 115A, 115N. The network 104 can be a private network (e.g., a local area network (LAN), a wide area network (WAN), intranet, etc.) or a public network (e.g., the Internet). The distributed computer system 100 can also include a middleware layer that is implemented by a collection of middleware layer modules 122. In one embodiment, the middleware layer is a messaging system (also referred herein as "message-oriented middleware layer"). Message-oriented middleware is a system that is used to route messages between software applications using a communication channel via an application programming interface (API), as described in more details herein above.

The client devices 102A, 102N and server devices 115A, 115B can be a server, a workstation, a personal computer (PC), a mobile phone, a smart phone, a mobile computing device, a personal digital assistant (PDA), tablet, laptop computer, thin client, etc. The client devices 102A, 102N can include one or more central processing units (CPUs), memory, and storage devices (e.g., a data storage device or a mass storage device, such as a magnetic or optical storage based disk, tape or hard drive). Client devices 102A, 102N can also include one or more peripheral devices, which can include network devices, graphics devices, system components (e.g., bridges, ports, buses) media devices, (e.g., video cards, sounds cards, etc.).

Server devices 115A and 115B can each be, for example, personal computers (PC), palm-sized computing devices, personal digital assistants (PDA), mobile phones, tablet computers, game consoles, desktop computers, servers (e.g., rackmount servers), databases, or other computing devices. Typically, a server device 115A-115N will have more available resources than a client device 102A-102N. However, some server devices 115A-115N may be resource constrained, and/or some client devices 102A-102N may have an abundance of resources. Also, traditionally server devices will provide application level services such as business logic that runs in application servers. Client devices typically run applications that consume data provided by application level services and/or that interact with application level services. However, client devices may also run application level services, and server devices may also include client applications.

Server devices 115A-115N and client devices 102A-102N may run middleware layer modules 122. The middleware layer modules 122 may communicate with one another to establish a middleware layer. Alternatively, a middleware layer module 122 may create a standalone middleware layer on a host machine (e.g., on a client devices or server devices). Middleware layer modules 122 may run middleware services (e.g., a message-oriented middleware system), which may provide functionality to applications and services running on server devices 115A-115N and/or client devices 102A-102N.

A client device 102A-102N may run an application that uses the middleware layer. The application may be a distributed application, may be a standalone application, or may be a component of a distributed application. When the application loads on a client device 120A-102N, the middleware layer modules 122 may determine middleware services and/or other services that will be used to support the application, and may determine whether to execute those middleware services and/or other services on the client devices 102A-102N or a remote machine (e.g., another client device 102A-102N and/or a server device 115A-115N). The middleware layer modules 122 may then load the middleware services and/or other services on the determined devices. The middleware modules 122 may additionally migrate, uninstall, install and/or update middleware services as the distributed computing system 100 changes. For example, if an application originally running on a personal computer (PC) client device is migrated to a mobile phone client device, the services may be updated, replaced and/or migrated.

Figure 2:
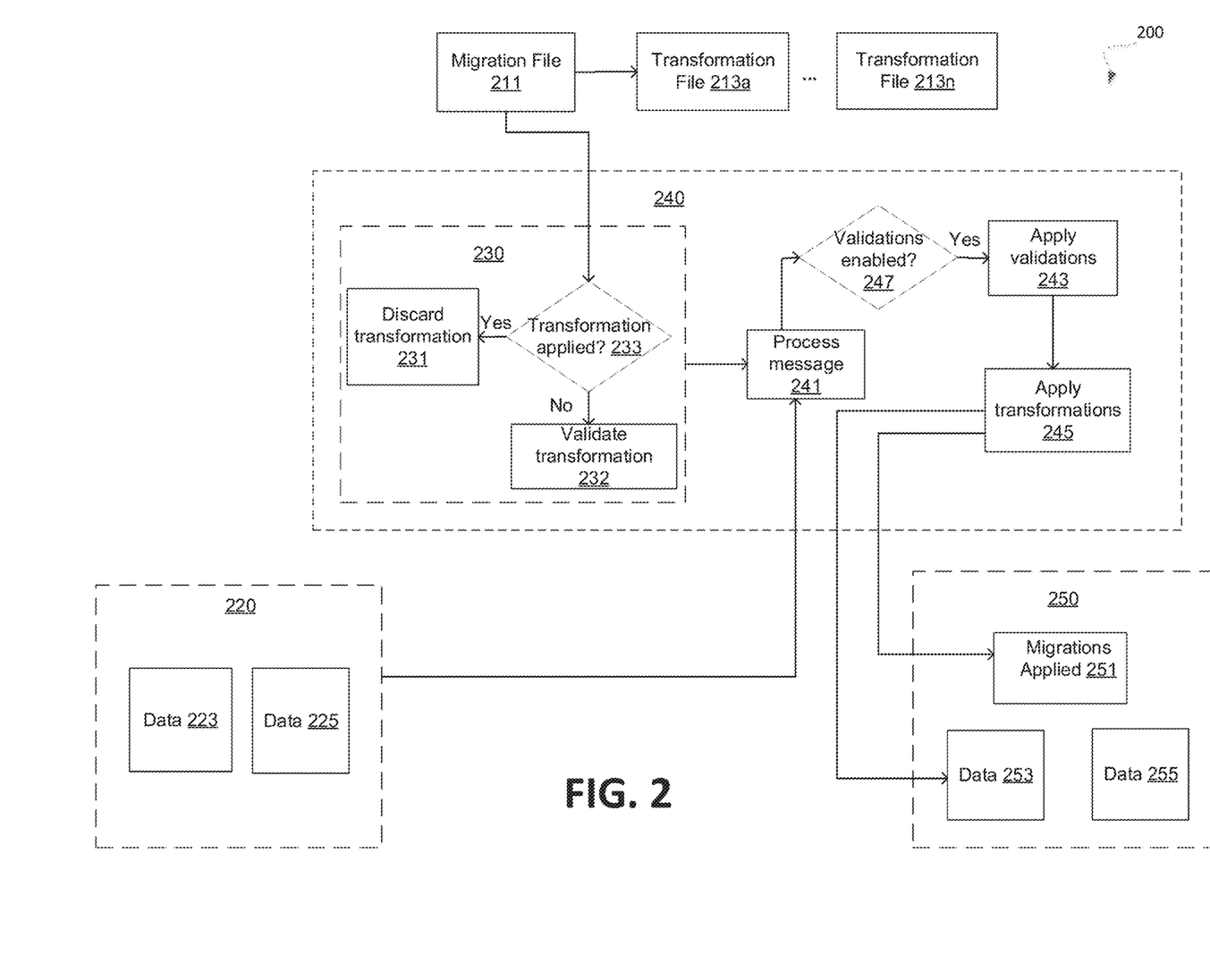
FIG. 2 is a flow diagram illustrating the migration of a message schema, in accordance with one or more aspects of the present disclosure.

FIG. 2 is a flow diagram 200 illustrating the migration of a message schema, in accordance with one or more aspects of the present disclosure. As illustrated, a middleware layer module 240 (e.g., the middleware layer module 122 of FIG. 122) can receive a migration file 211. The migration file can be received from a software application (e.g., from a user of a client device, such as the client device 102A and/or 102N of FIG. 1) via an API call. In some embodiments, the migration file can include one or more pointers to one or more transformation files 213a through 213n. The one or more transformation files, as described in more details herein below, can include one or more transformations (e.g., operations) to be performed on incoming messages from a software application (e.g., from a user of a client device, such as the client device 102A and/or 102N of FIG. 1). In some embodiments, each transformation file can be in a human-readable format, such as JSON, YAML, etc. In some embodiments, the migration file can specify an order of applying each transformation to a message of the incoming messages.

Responsive to receiving the migration file, the middleware layer module 240 can determine, at operation 233, whether each transformation referenced in each transformation file has been applied. As described in more details herein below, the middleware layer module 240 can determine whether each transformation has been applied by identifying, using the migration file or another data structure, a status of each transformation (i.e., whether the transformation has a status of already being applied or not being applied). If the transformation has been applied, the middleware layer module 240 can discard the transformation at operation 231. Discarding the transformation can include updating the status associated with the transformation in the migration file and skipping the transformation when applying each transformation to the message.

At operation 241, the middleware layer module 240 can process (e.g., receive) incoming messages from a software application 220. As illustrated, the incoming messages can be a data 223 and a data 225. The middleware layer module 240 can determine, at operation 247, whether a set of validations has been enabled for the incoming messages. Determining whether a set of validations has been enabled for the incoming messages can include identifying, using the migration file, whether there are a set of validations enabled (e.g., a set of validations that are to be applied to the incoming messages), as described in more details herein below. In response to determining that the validations have been enabled, the middleware layer module 240 can apply the validations to the incoming messages at operation 243. In some embodiments, applying the validations to a message of the incoming messages can include performing each validation. Each validation can include, for example, syntax validity checks and/or schema/format compatibility checks.

At operation 245, in response to applying the validations to the message, the middleware layer module 240 applies each transformation to the message according to the determined order of applying each transformation. The order for applying the transformations can be specified in the migration file 211. More details regarding applying the transformations are described herein below.

At operation 251, in response to applying the transformations to the message, the middleware layer module 240 can forward the message to a channel of a messaging system, as described in more details herein below. In some embodiments, in response to applying the transformations to the message, the middleware layer module 240 can also forward another message to a same or different channel of a same or different messaging system, where the other message includes a list of each transformation applied to the message.

Further details with respect to the middleware layer module 240 are described herein below with regard to FIGS. 3-5.

Figure 3:
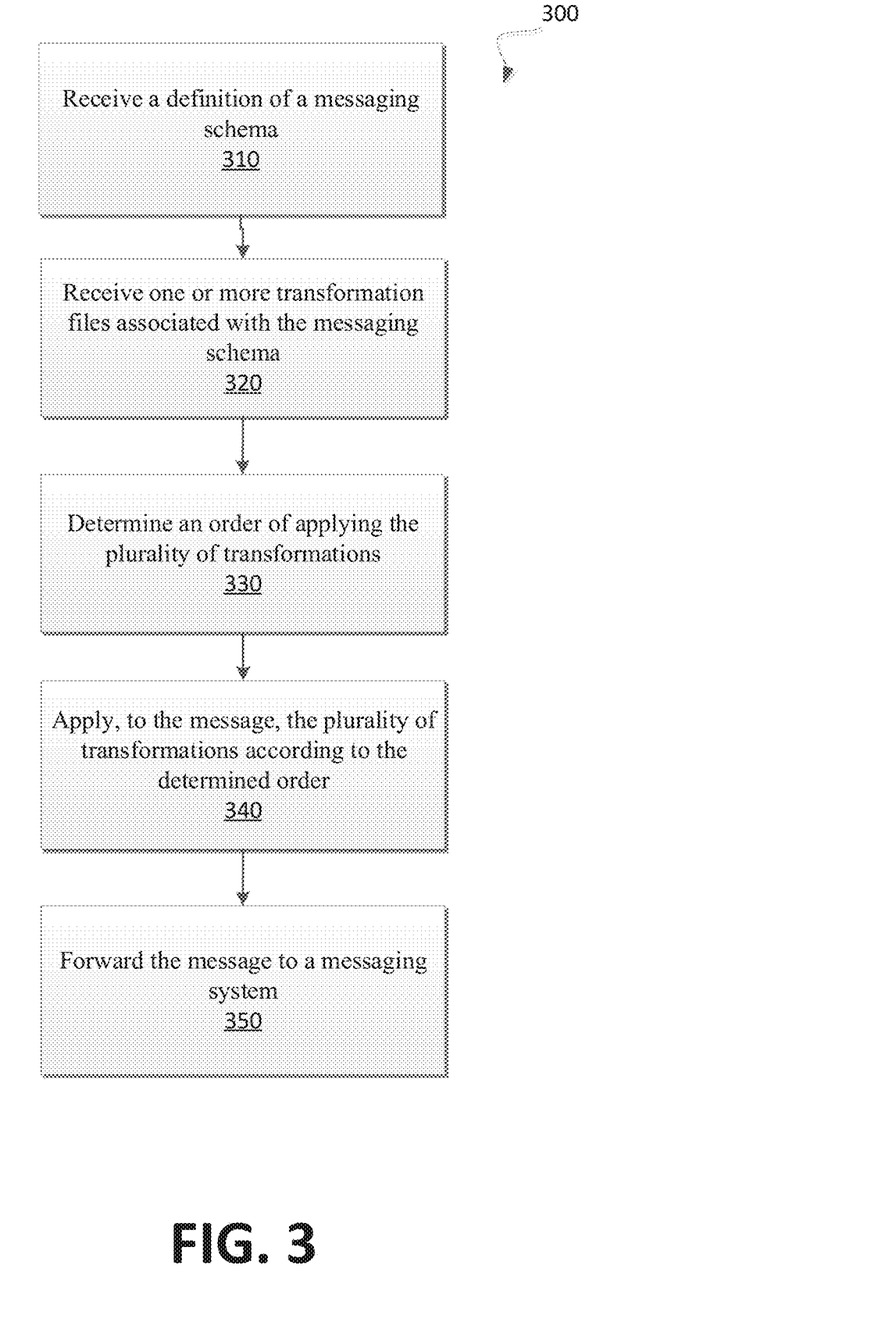
FIG. 3 is a flow diagram of a method for providing message schema migration in messaging systems, in accordance with one or more aspects of the present disclosure.

FIG. 3 depicts a block diagram of a method 300 for providing message schema migration in messaging systems, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., client devices 102A, 102N and/or server devices 115A, 115N of FIG. 1) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms).

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, at operation 310, the processing logic receives a definition of a messaging schema. In some embodiments, the processing logic can receive the messaging schema from a software application (e.g., from a user of a client device, such as the client device 102A and/or 102N of FIG. 1) via an API call. The messaging schema can define how data related to messages sent between software applications via a messaging system (e.g., the middleware layer module 122 of FIG. 1) is organized by specifying fields, data types, and relationships between these entities. Some common schema types are Avro, JavaScript Object Notation (JSON) Schema, and Protocol Buffers (Protobuf), as described in more detail herein above.

At operation 320, the processing logic receives one or more transformation files associated with the messaging schema. In some embodiments, the processing logic can receive the one or more transformation files from the software application from which the message was sent. In some embodiments, the processing logic can receive the one or more transformation files from another software application (e.g., another client device of the client devices 102A, 102N of FIG. 1). Each of the one or more transformation files can define a set of transformations to be applied to incoming messages. In some embodiments, each transformation can be an operation to be applied to each of the incoming messages. The operation can be an "add new field" operation, and/or a "modify existing field" operation, and/or a "remove existing field" operation. In some embodiments, the operation can be any other operation that can be applied to migrate a message schema from one schema to another schema. In some embodiments, each transformation file can be a transformation schema. For example, an example transformation file can be the following:

```
{
    "transformations": [{
        "remove": "name"
    },
    {
        "add": "country",
        "value": "ES"
    },
    {
        "modify": "city",
        "value": "New York"
    }
    ]
}
```

As illustrated above, a transformation file can include multiple fields specifying multiple transformation operations, including a "remove," "add," and "modify operation. In some embodiments, each transformation file can be formatted in a human-readable format (e.g., JSON, YAML, etc.).

At operation 330, the processing logic determines an order of applying the set of transformations to incoming messages. In some embodiments, determining the order of applying the set of transformations is specified in another file (i.e., a migration file). In some embodiments, the migration file can include one or more pointers to the one or more transformation files. In some embodiments, the processing logic can receive the migration file from a software application (i.e., the software application sending a message and/or the transformation files). The migration file can list the set of transformations referenced in each of the one or more transformation files in a particular order. The particular order in which the set of transformations is listed can be the order in which each transformation is to be applied to incoming messages. In some embodiments, the processing logic can store the migration file on the messaging system (e.g., the middleware layer module 122 of FIG. 1). In some embodiments, the migration file can further list a status of each transformation (e.g., flag each transformation that has already been applied to the incoming messages).

At operation 340, the processing logic applies the set of transformations to a message according to the determined order of applying the set of transformations. In some embodiments, applying the one or more transformations to the message includes performing each operation referenced by the one or more transformations files on the message according the order of execution received from the user. For example, the processing logic can perform an "add existing field" operation and/or a "remove existing field" operation and/or a "modify existing field" operation on the message. In some embodiments, the processing logic applies the set of transformations in response to determining that each transformation of the one or more transformations has not been applied to the incoming messages. In some embodiments, determining that each transformation has not been applied to the incoming messages can be based on identifying a status of each transformation as listed in the migration file. In some embodiments, identifying the status of a transformation can include identifying that the transformation is flagged as already being applied to the incoming messages. For example, the transformation can be associated with metadata that specifies that the transformation has been applied. In some embodiments, the transformation can be associated with metadata that specifies that the transformation has not been applied. In some embodiments, the migration file can include an entry associated with each transformation that identifies each transformation as already having been applied or not having been applied. Responsive to identifying that a transformation has already been applied, the processing logic can skip to a consecutive transformation according to the determined order of applying the set of transformations.

At operation 350, the processing logic forwards the message to a messaging system. In some embodiments, forwarding the messaging to a messaging system includes identifying a messaging system from which the message was received. The processing logic can forward the message to the identified messaging system. Forwarding the message to the identified messaging system can further include identifying a channel of the identified messaging system from which the message was received. The processing logic can forward the message to the identified channel of the identified messaging system. In some embodiments, in response to identifying the channel of the identified messaging system from which the message was received, the processing logic can identify another channel of the identified messaging system that is different from the identified channel. The processing logic can forward the message (e.g., publish the message) to the identified other channel. In some embodiments, forwarding the message can include, in response to identifying the messaging system from which the message was received, identifying another messaging system that is different from the identified messaging system. The processing logic can forward the message to a channel of the identified other messaging system.

Figure 4:
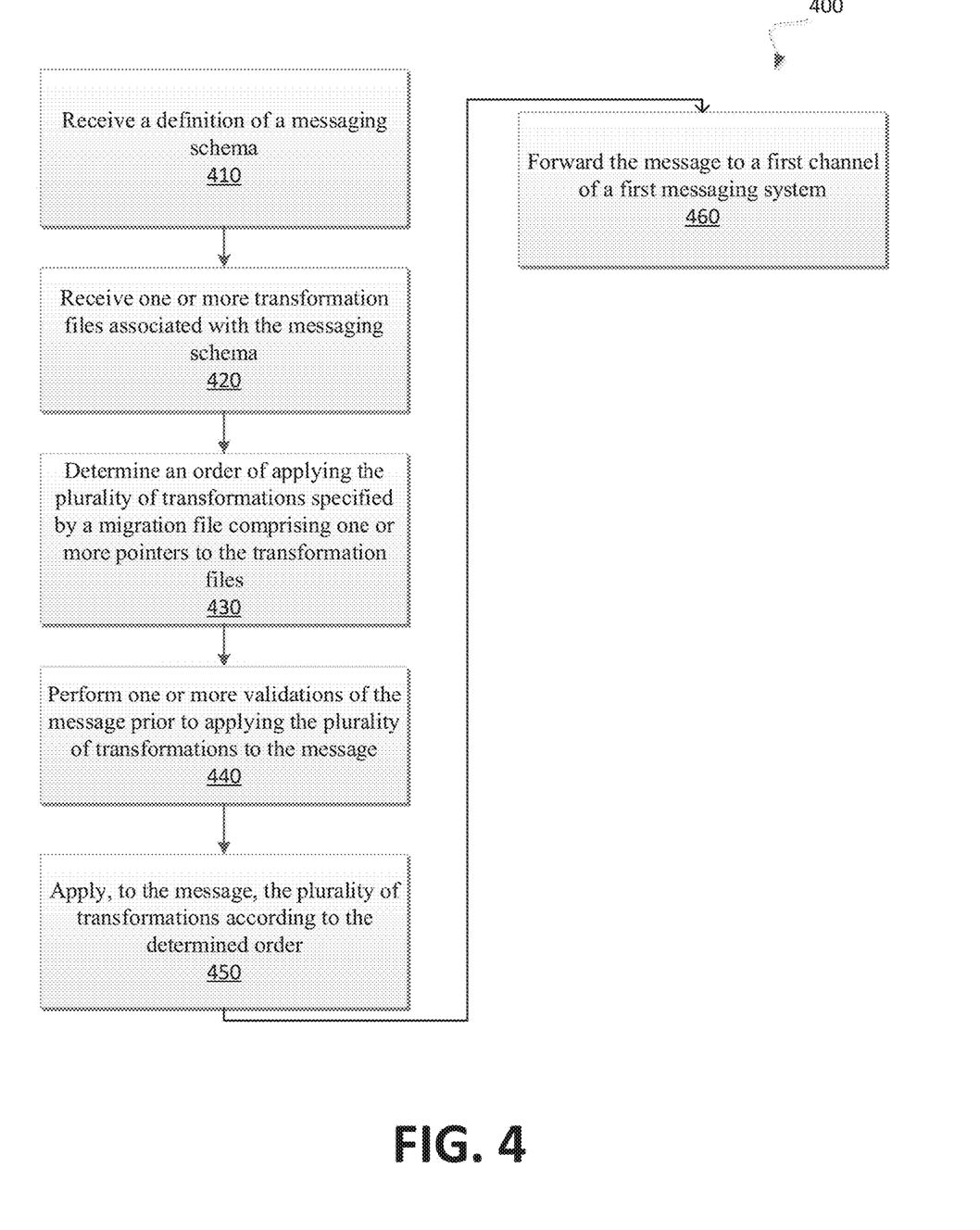
FIG. 4 is a flow diagram of a method for providing message schema migration in messaging systems, in accordance with one or more aspects of the present disclosure.

FIG. 4 depicts a block diagram of a method 400 for providing message schema migration for messaging systems, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., client devices 102A, 102N and/or server devices 115A, 115N of FIG. 1) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms).

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 4, at operation 410, the processing logic receives a definition of a messaging schema. In some embodiments, the processing logic can receive the messaging schema from a software application (e.g., from a user of a client device, such as the client device 102A and/or 102N of FIG. 1) via an API call. The messaging schema can define how data related to messages sent between software applications via a messaging system (e.g., the middleware layer module 122 of FIG. 1) is organized by specifying fields, data types, and relationships between these entities. Some common schema types are Avro, JavaScript Object Notation (JSON) Schema, and Protocol Buffers (Protobuf), as described in more detail herein above.

At operation 420, the processing logic receives one or more transformation files associated with the messaging schema. In some embodiments, the processing logic can receive the one or more transformation files from the software application from which the message was sent. In some embodiments, the processing logic can receive the one or more transformation files from another software application (e.g., another client device of the client devices 102A, 102N of FIG. 1). Each of the one or more transformation files can define a set of transformations to be applied to incoming messages. In some embodiments, each transformation can be an operation to be applied to each of the incoming messages. The operation can be an "add new field" operation, and/or a "modify existing field" operation, and/or a "remove existing field" operation. In some embodiments, the operation can be any other operation that can be applied to migrate a message schema from one schema to another schema. In some embodiments, each transformation file can be a transformation schema. For example, an example transformation file can be the following:

```
{
    "transformations": [{
        "remove": "name"
    },
    {
        "add": "country",
        "value": "ES"
    },
    {
        "modify": "city",
        "value": "New York"
    }
    ]
}
```

As illustrated above, a transformation file can include multiple fields specifying multiple transformation operations, including a "remove," "add," and "modify operation. In some embodiments, each transformation file can be formatted in a human-readable format (e.g., JSON, YAML, etc.).

At operation 430, the processing logic determines an order of applying the set of transformations to incoming messages. In some embodiments, determining the order of applying the set of transformations is specified in another file (i.e., a migration file). In some embodiments, the migration file can include one or more pointers to the one or more transformation files. In some embodiments, the processing logic can receive the migration file from a software application (i.e., the software application sending a message and/or the transformation files). The migration file can list the set of transformations referenced in each of the one or more transformation files in a particular order. The particular order in which the set of transformations is listed can be the order in which each transformation is to be applied to incoming messages. In some embodiments, the processing logic can store the migration file on the messaging system (e.g., the middleware layer module 122 of FIG. 1). In some embodiments, the migration file can further list a status of each transformation (e.g., flag each transformation that has already been applied to the incoming messages).

At operation 440, the processing logic performs one or more validations of the message. In some embodiments, performing the one or more validations include applying each validation to the message. In some embodiments, the processing logic identifies each validation using the migration file. In some embodiments, the migration file can include an entry listing each validation to be applied to the message. In response to identifying each validation to be applied, the processing logic can determine, based on the migration file, that each identified validation has not been applied to the message. For example, the migration file can include an entry associated with each identified validation that flags each validation as already being applied to the message or not being applied to the message. The processing logic can identify each validation that has not been applied to the message. The processing logic can perform each identified validation that has not been applied to the message. In some embodiments, a validation can include a syntax validity check and/or schema/format compatibility check.

At operation 450, the processing logic applies the set of transformations to a message according to the determined order of applying the set of transformations. In some embodiments, applying the one or more transformations to the message includes performing each operation referenced by the one or more transformations files on the message according the order of execution received from the user. For example, the processing logic can perform an "add existing field" operation and/or a "remove existing field" operation and/or a "modify existing field" operation on the message. In some embodiments, the processing logic applies the set of transformations in response to determining that each transformation of the one or more transformations has not been applied to the incoming messages. In some embodiments, determining that each transformation has not been applied to the incoming messages can be based on identifying a status of each transformation as listed in the migration file. In some embodiments, identifying the status of a transformation can include identifying that the transformation is flagged as already being applied to the incoming messages. For example, the transformation can be associated with metadata that specifies that the transformation has been applied. In some embodiments, the transformation can be associated with metadata that specifies that the transformation has not been applied. In some embodiments, the migration file can include an entry associated with each transformation that identifies each transformation as already having been applied or not having been applied. Responsive to identifying that a transformation has already been applied, the processing logic can skip to a consecutive transformation according to the determined order of applying the set of transformations. In some embodiments, the processing logic performs applies the set of transformations to the message in response to performing the one or more validations of the message at operation 440.

At operation 460, the processing logic forwards the message to a channel of a messaging system. In some embodiments, forwarding the messaging to the messaging system includes identifying a messaging system from which the message was received. The processing logic can further identify the channel of the identified messaging system from which the message was received. The processing logic can forward the message to the identified channel of the identified messaging system. In some embodiments, in response to identifying the channel of the identified messaging system from which the message was received, the processing logic can identify another channel of the identified messaging system that is different from the identified channel. The processing logic can forward the message (e.g., publish the message) to the identified other channel. In some embodiments, forwarding the message can include, in response to identifying the messaging system from which the message was received, identifying another messaging system that is different from the identified messaging system. The processing logic can forward the message to a channel of the identified other messaging system.

In some embodiments, the processing logic can forward another message to a channel and/or messaging system that is different from the channel/messaging system to which the message at operation 460 was forwarded. In some embodiments, the processing logic can forward the other message to the same channel and/or messaging system from the channel/messaging system to which the message at operation 460 was forwarded. The other message can include a list of the set of transformations that were applied to the message. In some embodiments, the processing logic can update the status of each of the transformations of the set of transformations that were applied as listed in the migration file. For example, the processing logic can update each entry associated with the status of each transformation with data indicating that the transformation was applied to the message.

Figure 5:
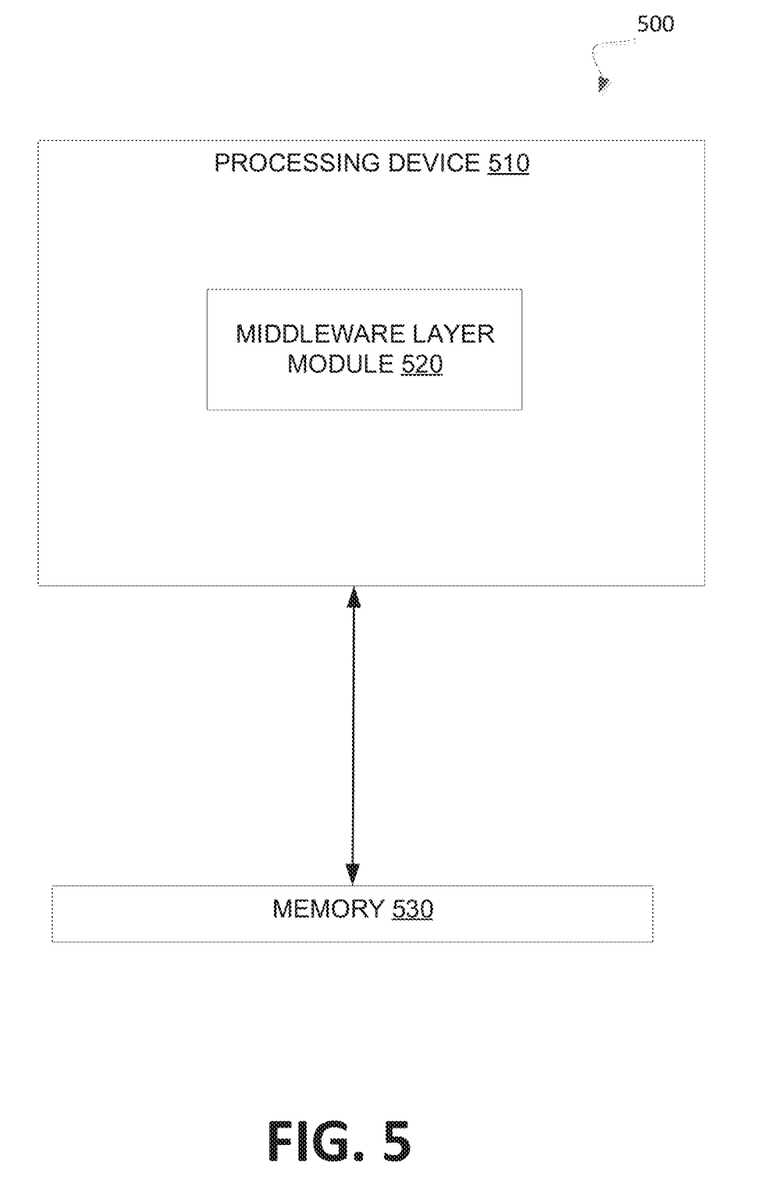
FIG. 5 depicts a block diagram of an illustrative computer system operating in accordance with one or more aspects of the present disclosure.

FIG. 5 is a block diagram example of a computer system 500 operating in accordance with one or more aspects of the present disclosure. Computer system 500 may be the same or similar to the computer system 100 of FIG. 1 and may include one or more processing devices and one or more memory devices. In the example shown, computer system 500 may include a middleware layer module 520 (e.g., the middleware layer module 122 of FIG. 1). Alternatively, the functionality of the middleware layer module 420 may be divided into multiple sub-modules.

Middleware layer module 520 is responsible for receiving messages, such as messages sent from a client device 102A to a client device 102N. The middleware layer module 520 is also responsible for receiving a definition of a messaging schema. The middleware layer module 520 is also responsible for receiving one or more transformation files associated with the messaging schema. The one or more transformation files can define a set of transformations to be applied to incoming messages of the middleware layer module 520. The middleware layer module 520 is also responsible for determining an order for applying the set of transformations. The middleware layer module 520 is also responsible for determining whether the set of transformations have already been applied to the message. The middleware layer module 520 is further responsible for determining whether validations need to be applied and applying the validations to the message. The middleware layer module 520 is also responsible for applying the one or more transformations to the message. The middleware layer module 520 is responsible for forwarding the message to a channel of a messaging system. Further details with regard to the middleware layer module 520 is described herein above with reference to FIGS. 1-4.

Figure 6:
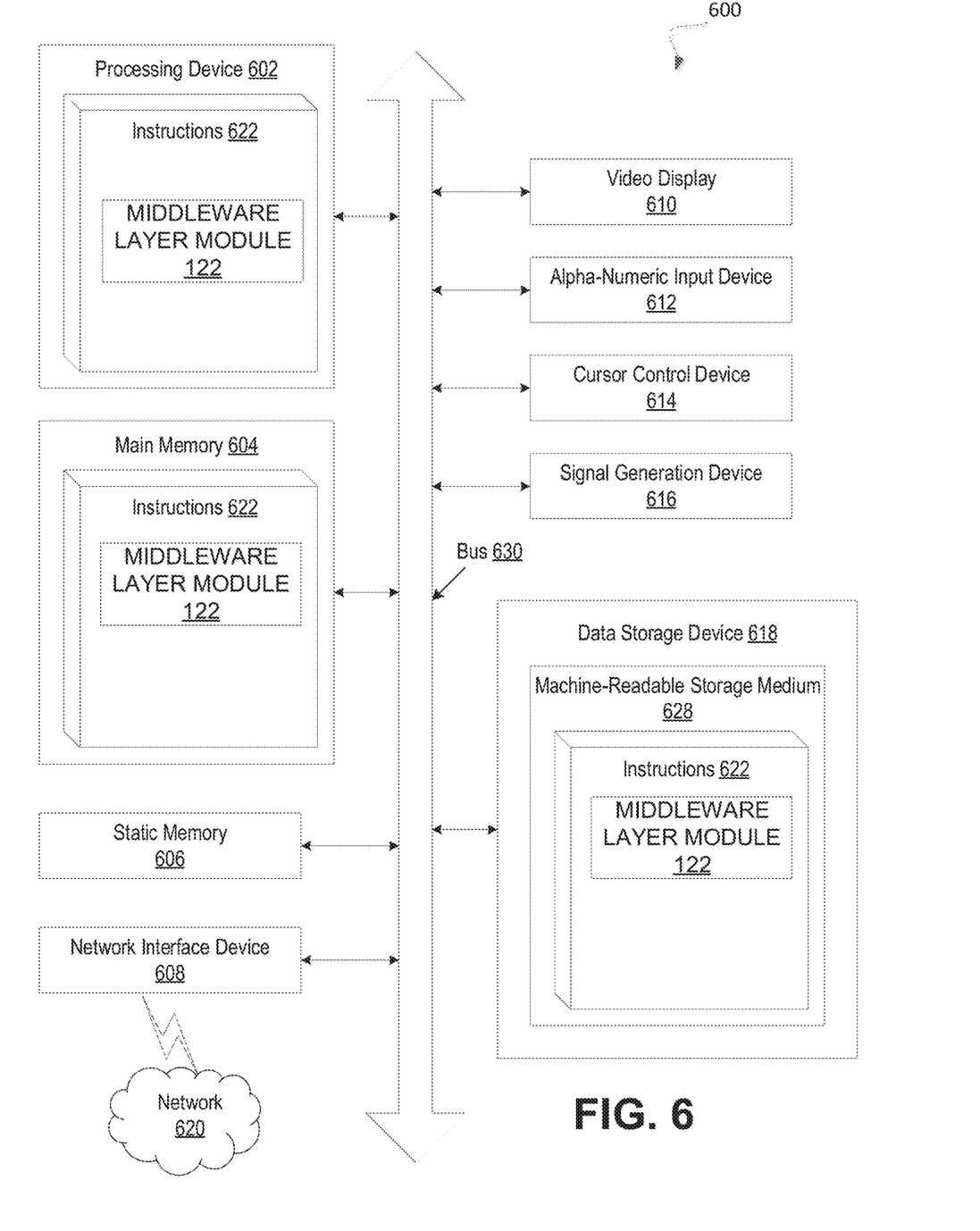
FIG. 6 depicts a block diagram that illustrates one implementation of a computer system in accordance with one or more aspects of the present disclosure.

FIG. 6 is a diagrammatic representation of a machine in the exemplary form of a computer system 600 within which a set of instructions for causing the machine to perform any one or more of the methodologies discussed herein may be executed. In various illustrative examples, computer system 600 may correspond to computer system 100 of FIG. 1.

In certain embodiments, computer system 600 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 600 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 600 may include a processing device 602, a main memory 604 (e.g., read-only memory (ROM), flash memory, dynamic random access memory (DRAM) (such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 602 may also be one or more special-purpose processing devices such as an application specific integrated circuit (ASIC), a field programmable gate array (FPGA), a digital signal processor (DSP), network processor, or the like. Processing device 602 may be configured to provide message schema migration for messaging systems, as discussed herein.

Computer system 600 may further include a network interface device 608. Computer system 600 may also include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions 622 embodying any one or more of the methodologies of functions described herein. The instructions 622 may also reside, completely or at least partially, within main memory 604 and/or within processing device 602 during execution thereof by computer system 600; main memory 604 and processing device 602 also constituting machine-readable storage media. The instructions 622 may further be transmitted or received over a network 626 via network interface device 608.

Machine-readable storage medium 628 may also be used to store the device queue manner logic persistently. While machine readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," "mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required methods 300 and/or 400, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:
   receiving a definition of a messaging schema;
   receiving one or more transformation files associated with the messaging schema, wherein the one or more transformation files define a plurality of transformations to be applied to incoming messages;
   determining an order of applying the plurality of transformations;
   identifying, based on a migration file associated with the one or more transformation files, a status of whether each transformation of the plurality of transformations has been applied to a message of the incoming messages;
   applying, to the message of the incoming messages, one or more transformations of the plurality of transformations according to the determined order and the identified status; and
   forwarding the message to a messaging system.

2. The method of claim 1, wherein the order of applying the plurality of transformations is specified by the migration file, wherein the migration file comprises one or more pointers to the one or more transformation files.

3. The method of claim 1, further comprising:
   performing one or more validations of the message prior to applying the plurality of transformations to the message.

4. The method of claim 1, wherein forwarding the message to the messaging system comprises:
   identifying a first messaging system from which the message was received; and
   forwarding the message to the first messaging system.

5. The method of claim 1, wherein forwarding the message to the messaging system comprises:
   identifying a first messaging system from which the message was received; and
   forwarding the message to a second messaging system, wherein the second messaging system is different from the first messaging system.

6. The method of claim 1, wherein forwarding the message to the messaging system comprises:
   identifying a first channel of a first messaging system from which the message was received; and
   forwarding the message to the first channel of the first messaging system.

7. The method of claim 1, wherein forwarding the message to the messaging system comprises:
   identifying a first channel of a first messaging system from which the message was received; and
   forwarding the message to a second channel of the first messaging system, wherein the second channel is different from the first channel.

8. A system comprising:
   a memory;
   a processing device operatively coupled to the memory, the processing device configured to:
   receive a definition of a messaging schema;
   receive one or more transformation files associated with the messaging schema, wherein the one or more transformation files define a plurality of transformations to be applied to incoming messages;
   determine an order of applying the plurality of transformations;
   identify, based on a migration file associated with the one or more transformation files, a status of whether each transformation of the plurality of transformations has been applied to a message of the incoming messages;
   apply, to the message of the incoming messages, one or more transformations of the plurality of transformations according to the determined order and the identified status; and
   forward the message to a messaging system.

9. The system of claim 8, wherein the order of applying the plurality of transformations is specified by the migration file, wherein the migration file comprises one or more pointers to the one or more transformation files.

10. The system of claim 8, further comprising:
    performing one or more validations of the message prior to applying the plurality of transformations to the message.

11. The system of claim 8, wherein forwarding the message to the messaging system comprises:
    identifying a first messaging system from which the message was received; and
    forwarding the message to the first messaging system.

12. The system of claim 8, wherein forwarding the message to the messaging system comprises:

identifying a first messaging system from which the message was received; and forwarding the message to a second messaging system, wherein the second messaging system is different from the first messaging system.

13. The system of claim 8, wherein forwarding the message to the messaging system comprises:

identifying a first channel of a first messaging system from which the message was received; and forwarding the message to the first channel of the first messaging system.

14. A non-transitory computer-readable storage medium comprising instructions that, when executed by a processing device, cause the processing device to perform operations comprising:

receiving a definition of a messaging schema;

receiving one or more transformation files associated with the messaging schema, wherein the one or more transformation files define a plurality of transformations to be applied to incoming messages;

determining an order of applying the plurality of transformations;

identifying, based on a migration file associated with the one or more transformation files, a status of whether each transformation of the plurality of transformations has been applied to a message of the incoming messages;

applying, to the message of the incoming messages, one or more transformations of the plurality of transformations according to the determined order and the identified status; and forwarding the message to a messaging system.

15. The non-transitory computer-readable storage medium of claim 14, wherein the order of applying the plurality of transformations is specified by the migration file, wherein the migration file comprises one or more pointers to the one or more transformation files.

16. The non-transitory computer-readable storage medium of claim 14, further comprising:

performing one or more validations of the message prior to applying the plurality of transformations to the message.

17. The non-transitory computer-readable storage medium of claim 14, wherein forwarding the message to the messaging system comprises:

identifying a first messaging system from which the message was received; and forwarding the message to the first messaging system.

18. The non-transitory computer-readable storage medium of claim 14, wherein forwarding the message to the messaging system comprises:

identifying a first messaging system from which the message was received; and forwarding the message to a second messaging system, wherein the second messaging system is different from the first messaging system.

19. The non-transitory computer-readable storage medium of claim 14, wherein forwarding the message to the messaging system comprises:

identifying a first channel of a first messaging system from which the message was received; and forwarding the message to the first channel of the first messaging system.

20. The non-transitory computer-readable storage medium of claim 14, wherein forwarding the message to the messaging system comprises:

identifying a first channel of a first messaging system from which the message was received; and forwarding the message to a second channel of the first messaging system, wherein the second channel is different from the first channel.

* * * * *